US012092859B2

(12) United States Patent
Takenaga et al.

(10) Patent No.: US 12,092,859 B2
(45) Date of Patent: Sep. 17, 2024

(54) MULTICORE FIBER, OPTICAL FIBER CABLE, AND OPTICAL CONNECTOR

(71) Applicant: Fujikura Ltd., Tokyo (JP)

(72) Inventors: Katsuhiro Takenaga, Chiba (JP); Yusuke Sasaki, Chiba (JP); Masaki Ohzeki, Chiba (JP)

(73) Assignee: Fujikura Ltd., Tokyo (JP)

( * ) Notice: Subject to any disclaimer, the term of this patent is extended or adjusted under 35 U.S.C. 154(b) by 211 days.

(21) Appl. No.: 17/757,960

(22) PCT Filed: Dec. 16, 2020

(86) PCT No.: PCT/JP2020/046999
§ 371 (c)(1),
(2) Date: Jun. 24, 2022

(87) PCT Pub. No.: WO2021/131977
PCT Pub. Date: Jul. 1, 2021

(65) Prior Publication Data
US 2023/0017442 A1    Jan. 19, 2023

(30) Foreign Application Priority Data

Dec. 26, 2019    (JP) ................. 2019-237525

(51) Int. Cl.
*G02B 6/02*      (2006.01)
*G02B 6/38*      (2006.01)
*G02B 6/44*      (2006.01)

(52) U.S. Cl.
CPC ....... *G02B 6/02042* (2013.01); *G02B 6/3885* (2013.01); *G02B 6/3833* (2013.01); *G02B 6/4433* (2013.01)

(58) Field of Classification Search
CPC .............. G02B 6/02042; G02B 6/3833; G02B 6/3885; G02B 6/4433
See application file for complete search history.

(56) References Cited

U.S. PATENT DOCUMENTS 8,041,173 B2 * 10/2011 Imamura ............ G02B 6/02338
385/125
9,897,751 B2 *  2/2018 Hayashi ............ G02B 6/02042
(Continued)

FOREIGN PATENT DOCUMENTS

CN    106461858 A    2/2017
CN    106575013 A    4/2017
(Continued)

OTHER PUBLICATIONS

Y. Sasaki, et al., "Asymmetrically Arranged 8-Core Fibers with Center Core Suitable for Side-View Alignment in Datacenter Networks," 2020 Optical Fiber Communications Conference and Exhibition (OFC), San Diego, CA, USA, 2020, pp. 1-3. (Year: 2020 ).*
(Continued)

*Primary Examiner* — Daniel Petkovsek
(74) *Attorney, Agent, or Firm* — Osha Bergman Watanabe & Burton LLP

(57) ABSTRACT

A multicore fiber includes: a cladding; and three or more and five or less cores disposed at rotationally asymmetric positions on a circumference centered at a center of the cladding. No core is disposed at the center of the cladding. Angles formed by adjacent ones of lines connecting the center of the cladding and respective ones of the cores are all larger than 60°.

15 Claims, 4 Drawing Sheets

(56) References Cited

U.S. PATENT DOCUMENTS

| 9,976,880 B2* | 5/2018 | Brehm | G01D 11/00 |
|---|---|---|---|
| 11,327,250 B1* | 5/2022 | Stone | G02B 6/02042 |
| 2013/0108206 A1* | 5/2013 | Sasaoka | G02B 6/02042 |
| | | | 385/11 |
| 2014/0029889 A1 | 1/2014 | Brehm et al. | |
| 2014/0053654 A1 | 2/2014 | Rogge et al. | |
| 2015/0160408 A1 | 6/2015 | Bickham et al. | |
| 2016/0187577 A1 | 6/2016 | Sasaki et al. | |
| 2023/0036200 A1* | 2/2023 | Takenaga | G02B 6/4471 |

FOREIGN PATENT DOCUMENTS

| JP | 2011-193459 A | 9/2011 |
|---|---|---|
| JP | 2014-025928 A | 2/2014 |
| JP | 2018-536189 A | 12/2018 |
| WO | 2011/004836 A1 | 1/2011 |
| WO | 2012/026473 A1 | 3/2012 |
| WO | 2013/027776 A1 | 2/2013 |
| WO | 2016/063800 A1 | 4/2016 |
| WO | 2018/000232 A1 | 1/2018 |

OTHER PUBLICATIONS

International Search Report issued in corresponding International Application No. PCT/JP2020/046999 mailed Mar. 2, 2021 (5 pages).

* cited by examiner

MULTICORE FIBER, OPTICAL FIBER CABLE, AND OPTICAL CONNECTOR

TECHNICAL FIELD

The present invention relates to a multicore fiber, an optical fiber cable, and an optical connector.

BACKGROUND

In recent optical fiber communication systems, a large number of optical fibers such as several tens to several thousands of optical fibers are used, and the amount of transmission information has dramatically increased. In order to reduce the number of optical fibers in such optical fiber communication systems, a multicore fiber in which a plurality of cores is arranged in a cladding has been proposed. For example, Patent Literature 1 described below describes a multicore fiber in which six outer cores are arranged at equal intervals on the circumference centered on a center core arranged at a center of a cladding.

[Patent Literature 1] JP 2011-193459 A

However, in the multicore fiber of Patent Literature 1 described above, the center core is arranged at the center of the cladding. Since such a center core is adjacent to all the outer cores, crosstalk tends to concentrate on the center core. Therefore, there is a demand for suppressing such crosstalk of the center core.

Meanwhile, in a case where multicore fibers are connected to each other, there is a case where it is desired to specify a desired core from a plurality of cores of one multicore fiber, specify a desired core from a plurality of cores of the other multicore fiber, and connect the specified desired cores to each other. However, in the multicore fiber of Patent Literature 1 described above, the six outer cores are arranged at equal intervals, and the outer cores are arranged at rotationally symmetric positions. Therefore, it is difficult to specify a desired core in each of the one and the other multicore fibers and then connect these multicore fibers to each other unless a marker or the like is used. In addition, there is a case where the marker is smaller than the core, and in this case, even if there is a marker, it is difficult to specify a desired core and then connect these multicore fibers to each other.

SUMMARY

Therefore, one or more embodiments of the present invention provide a multicore fiber, an optical fiber cable, and an optical connector capable of suppressing crosstalk and facilitating connection.

A multicore fiber according to one or more embodiments of the present invention includes a cladding, and three or more and five or less cores arranged at non-rotationally symmetric positions on a circumference centered on the center of the cladding, in which no core is arranged at the center of the cladding, and angles formed by lines adjacent to each other among a plurality of lines connecting the center of the cladding and each of the cores arranged on the circumference are all larger than 60°.

In this multicore fiber, since no core is arranged at the center of the cladding, unlike Patent Literature 1 described above, crosstalk does not concentrate on the core arranged at the center of the cladding. Meanwhile, in general, in a multicore fiber, a core tends to be arranged at a position away from a cover layer to some extent from the viewpoint of suppressing absorption of light by the cover layer, the viewpoint of suppressing the influence of disturbance or the like from reaching the core, and the like. In addition, from the viewpoint of suppressing crosstalk, the core pitch tends to be increased as much as possible. Therefore, when the cladding diameter is the same, the radius of the circle in a case where the cores are arranged on the circumference centered on the center of the cladding tends to be substantially the same regardless of the number of cores. In the multicore fiber of the present invention, since the number of cores arranged on the circumference described above is three or more and five or less and the angles described above are all larger than 60°, the distance between adjacent cores is larger than the distance from the center of the cladding to the core. Therefore, it is possible to suppress crosstalk between adjacent cores as compared with the multicore fiber of Patent Literature 1 described above in which the distance between the adjacent cores is equal to the distance from the center of the cladding to the core.

Meanwhile, in a case where the cores are arranged rotationally symmetrically in the multicore fiber, it is difficult to specify a desired core unless a marker or the like is used as described above. However, since the cores are arranged at non-rotationally symmetric positions in the multicore fiber of the present invention, a desired core can be easily specified in each of one and the other multicore fibers without separately providing a marker or the like. Therefore, the multicore fibers can be easily connected to each other.

Here, the non-rotational symmetry refers to the relationship in which the arrangement of the cores before rotation and the arrangement of the cores after rotation do not match unless the multicore fiber is rotated once about the axis.

In addition, at least two cores of the cores may be arranged at non-line-symmetric positions with reference to a line passing through the center of the cladding and extending along the radial direction of the cladding.

When the cores are arranged at non-line-symmetric positions in the above manner, the appearance of the plurality of cores at one end of the multicore fiber is different from the appearance of the plurality of cores at the other end. Therefore, the multicore fibers can be connected to each other by distinguishing both end portions of the multicore fibers.

In addition, the angles may all be different.

In this case, since the angles formed by the cores are different from each other, it is possible to easily specify all the cores.

In addition, when the angles described above are all different, the number of cores may be four or more and the cores may be arranged such that the narrowest angle and the second narrowest angle are not adjacent to each other.

In this way, it is possible to suppress at least three cores from being densely arranged on the circumference described above. Therefore, it is possible to effectively suppress the crosstalk from concentrating on a specific core.

In addition, the number of cores may be four or more, two angles of the angles may be different from other angles, the two angles may be different from each other, and all the other angles may be the same.

In this case, since the structure is the simplest among the structures in which the plurality of cores is arranged at non-line-symmetric positions, a simple multicore fiber configuration can be realized.

In addition, an optical fiber cable according to one or more embodiments of the present invention includes a sheath and the multicore fiber according to any of the above arranged in the sheath.

With the multicore fiber described above, crosstalk can be suppressed and connection can be facilitated. Therefore, an optical fiber cable including such a multicore fiber can suppress crosstalk and facilitate connection.

In addition, an optical connector according to one or more embodiments of the present invention includes a ferrule and the multicore fiber according to any of the above, and the multicore fiber described above is arranged in a fiber insertion hole of the ferrule described above.

With the multicore fiber described above, crosstalk can be suppressed and connection can be facilitated. Therefore, an optical connector including such a multicore fiber can suppress crosstalk and facilitate connection.

As described above, according to the present invention, a multicore fiber, an optical fiber cable, and an optical connector capable of suppressing crosstalk and facilitating connection can be provided.

DETAILED DESCRIPTION

Aspects for carrying out the multicore fiber, the optical fiber cable, and the optical connector according to the present invention will be illustrated below together with the accompanying drawings. The embodiments illustrated below are for facilitating the understanding of the present invention, and are not for limiting the interpretation of the present invention. The present invention can be changed or modified from the embodiments below without departing from the spirit. In addition, in the present specification, the dimensions of each member may be exaggerated for ease of understanding.

Reference Example

Figure 1:
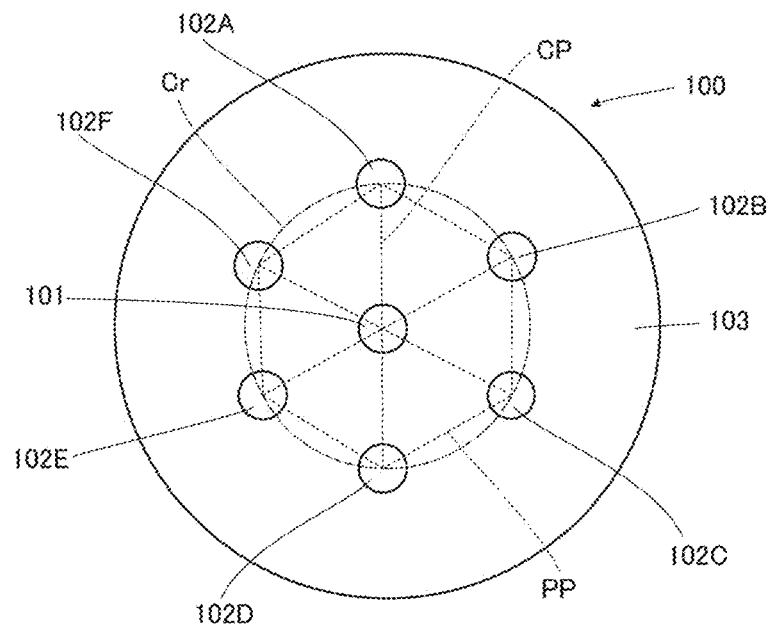
FIG. 1 is a diagram illustrating a structure of a cross section perpendicular to a longitudinal direction of a conventional optical fiber.

First, before describing the embodiments, a reference example will be described. FIG. 1 is a diagram illustrating a structure of a cross section perpendicular to a longitudinal direction of a multicore fiber 100 of the reference example. Note that, in FIG. 1, hatching is omitted to avoid complication of the drawing.

As illustrated in FIG. 1, the multicore fiber 100 of the reference example includes, as main configurations, a cladding 103, a center core 101 arranged at the center of the cladding 103, six outer cores 102A to 102F arranged on a circumference Cr centered on the center of the cladding 103, and a cover layer covering the cladding 103. Note that, in FIG. 1, illustration of the cover layer is omitted to avoid complication of the drawing. In the multicore fiber 100, the outer core 102B, the outer core 102C, the outer core 102D, the outer core 102E, and the outer core 102F are arranged in this order clockwise with reference to one outer core 102A.

The center core 101 and the outer cores 102A to 102F are formed to have the same diameter and the same refractive index, and propagate light of a fundamental mode or propagate light of several higher order modes in addition to the light of the fundamental mode. The refractive index of each of the center core 101 and the outer cores 102A to 102F is higher than the refractive index of the cladding 103. Examples of the material constituting the center core 101 and the outer cores 102A to 102F include quartz to which an element such as germanium (Ge) for increasing the refractive index is added. When an element for increasing the refractive index is added to the center core 101 and the outer cores 102A to 102F, examples of the material constituting the cladding 103 include pure quartz to which no dopant is added and quartz to which an element such as fluorine (F) for reducing the refractive index is added. In addition, examples of the material constituting the center core 101 and the outer cores 102A to 102F include the pure quartz described above. When the center core 101 and the outer cores 102A to 102F are formed of pure quartz, examples of the material constituting the cladding 103 include quartz to which an element such as fluorine (F) for reducing the refractive index is added.

In this example, the center core 101 and the two outer cores adjacent to each other are arranged on an equilateral triangle on the apexes of which the center of each of the three cores is located. Therefore, the angles formed by the lines adjacent to each other among the plurality of lines connecting the center of the center core 101 and the centers of the outer cores 102A to 102F are all 60°. Therefore, when a circle having a radius that is a line segment connecting the center of the center core 101 and the center of each of the outer cores 102A to 102F is the circumference Cr, a radius CP of the circumference Cr and a core pitch PP corresponding to the length of a line segment connecting the centers of adjacent outer cores are the same length. Therefore, the outer cores 102A to 102F of this example are arranged at rotationally symmetric positions on the circumference centered on the center of the cladding 103, and are arranged at line-symmetric positions with reference to a predetermined reference line passing through the center of the cladding 103. In addition, the core pitch PP is, for example, approximately 25 μm to approximately 50 μm, and crosstalk between adjacent outer cores is suppressed to a predetermined reference value or less.

In such multicore fiber 100, the center core 101 is arranged at the center of the cladding 103. Since such center core 101 is adjacent to all the outer cores 102A to 102F, crosstalk tends to concentrate on the center core 101. In addition, since the arrangement of the outer cores 102A to 102F is rotationally symmetric as described above, it is difficult to distinguish a specific core from the outer cores 102A to 102F unless a marker or the like is used. In addition, since the arrangement of the outer cores 102A to 102F is line-symmetric as described above, the appearance of the plurality of cores at one end of the multicore fiber 100 is the same as the appearance of the plurality of cores at the other end. Therefore, it is difficult to distinguish one end and the other end of the multicore fiber 100.

First Embodiments

Figure 2:
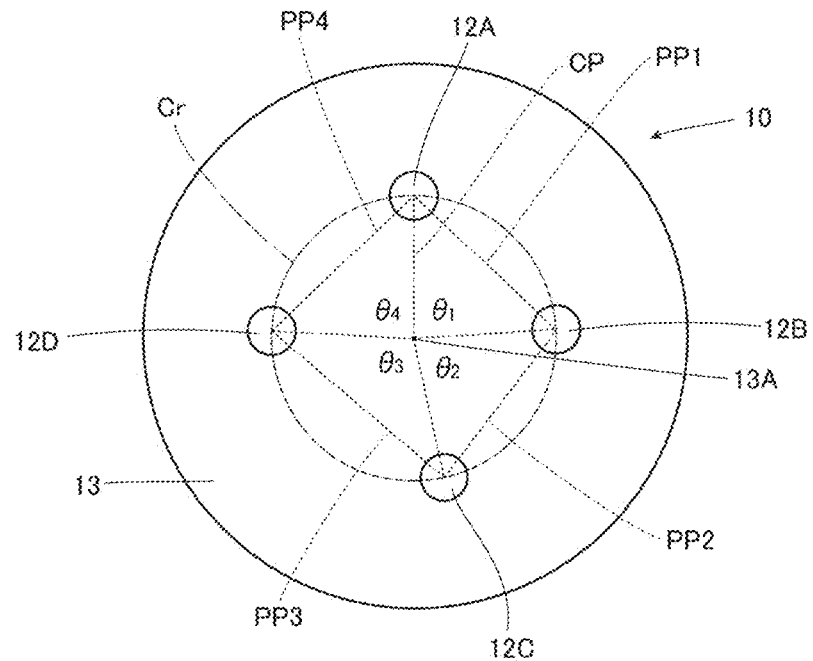
FIG. 2 is a diagram illustrating a structure of a cross section perpendicular to a longitudinal direction of a multicore fiber according to first embodiments.

Next, the first embodiments will be described. FIG. 2 is a diagram illustrating a structure of a cross section perpendicular to a longitudinal direction of the multicore fiber of the first embodiments. Note that, in FIG. 2, hatching is omitted to avoid complication of the drawing.

As illustrated in FIG. 2, a multicore fiber 10 of one or more embodiments includes a cladding 13, four cores 12A to 12D arranged on a circumference Cr centered on a center 13A of the cladding 13, and a cover layer covering the cladding 13. In addition, no core is arranged at the center 13A of the cladding 13, and no core is arranged between the center 13A of the cladding 13 and the cores 12A to 12D and outside the cores 12A to 12D. Note that, in FIG. 2, illustration of the cover layer is omitted to avoid complication of the drawing. In the multicore fiber 10, the core 12B, the core 12C, and the core 12D are arranged in this order clockwise with reference to one core 12A.

The cladding 13 is formed of the same material as the cladding 103 of the reference example, and is formed to have the same diameter and the same refractive index as those of the cladding 103. In addition, the cores 12A to 12D are formed of the same material as the center core 101 and the outer cores 102A to 102F of the reference example, and are formed to have the same core diameter and the same refractive index as those of the center core 101 and the outer cores 102A to 102F.

Here, assuming that an angle formed by lines adjacent to each other among a plurality of lines connecting the center 13A of the cladding 13 and the center of each of the cores 12A to 12D is an angle formed by the cores, in one or more embodiments, the angles formed by the cores are all larger than 60°. Of angles $\theta_1$ to $\theta_4$ formed by the plurality of cores, the angle $\theta_3$ formed by the cores 12C and 12D is 99°. On the other hand, the angle $\theta_1$ formed by the cores 12A and 12B, the angle $\theta_2$ formed by the cores 12B and 12C, and the angle $\theta_4$ formed by the cores 12D and 12A are each 87°. As described above, in one or more embodiments, only one angle $\theta_3$ of the angles $\theta_1$ to $\theta_4$ formed by the cores is different from the other angles, and all the other angles $\theta_1$, $\theta_2$, and $\theta_4$ are the same. Therefore, the cores 12A to 12D are arranged at non-rotationally symmetric (or rotationally asymmetric) positions on the circumference Cr. Here, the above-described lines connect the center of the cladding 13 and the center of each of the cores 12A to 12D, but the lines do not necessarily pass through the center of each core. For example, the above-described lines may connect the center of the cladding 13 and the non-central portion of each of the cores 12A to 12D.

Next, the relationship between the angle formed by the cores, the radius CP of the circumference Cr, and the core pitch of one or more embodiments will be described.

The magnitude relationship between the radius CP of the circumference Cr and the core pitch is determined by the angle formed by the cores. As described above, since the angle $\theta_1$ formed by the cores 12A and 12B is 87°, the center 13A of the cladding 13 is located on the apex forming an apex angle of an isosceles triangle in which the angle of the apex angle is 87°, and the centers of the cores 12A and 12B are located on the apexes forming the base angles. The length of each of the two equal sides of this isosceles triangle is the radius CP of the circumference Cr. Therefore, a core pitch PP1 between the cores 12A and 12B is larger than the radius CP of the circumference Cr.

As described above, the angles $\theta_1$ to $\theta_4$ formed by the cores are larger than 60°. Therefore, the core pitch PP2 between the cores 12B and 12C, the core pitch PP3 between the cores 12C and 12D, and the core pitch PP4 between the cores 12D and 12A are each larger than the radius CP of the circumference Cr.

As described above, the multicore fiber 10 of one or more embodiments includes the cladding 13, and the four cores 12A to 12D arranged at non-rotationally symmetric positions on the circumference Cr centered on the center 13A of the cladding 13, in which no core is arranged at the center 13A of the cladding 13, and the angles $\theta_1$ to $\theta_4$ formed by the cores are all larger than 60°.

With such multicore fiber 10 of one or more embodiments, since no core is arranged at the center 13A of the cladding 13, unlike the reference example described above, crosstalk does not concentrate on the core arranged at the center of the cladding. Meanwhile, in general, in a multicore fiber, a core tends to be arranged at a position away from a cover layer to some extent from the viewpoint of suppressing absorption of light by the cover layer, the viewpoint of suppressing the influence of disturbance or the like from reaching the core, and the like. In addition, from the viewpoint of suppressing crosstalk, the core pitch tends to be increased as much as possible. Therefore, when the cladding diameter is the same, the radius of the circle in a case where the cores are arranged on the circumference centered on the center of the cladding tends to be substantially the same regardless of the number of cores. In the multicore fiber 10, since the number of cores arranged on the circumference Cr is three or more and five or less and the angles $\theta_1$ to $\theta_4$ formed by the cores are all larger than 60°, the core pitch is larger than the distance from the center of the cladding to the core. Therefore, it is possible to suppress crosstalk between adjacent cores as compared with, for example, the multicore fiber 100 of the reference example in which the core pitch is equal to the distance from the center of the cladding to the core.

In addition, in one or more embodiments, as described above, since the arrangement of the cores 12A to 12D is non-rotationally symmetric, it is possible to easily specify a desired core from the cores 12A to 12D without separately providing a marker or the like. Therefore, the multicore fibers 10 can be easily connected to each other by making specified desired cores correspond to each other.

In addition, in one or more embodiments, the example in which the number of cores is four has been described, but the number of cores may be three or five. In such a case, when the angles formed by the cores are all larger than 60°, all the core pitches are larger than the radius CP of the circumference Cr. Therefore, the crosstalk between adjacent cores can be suppressed. In addition, when the number of cores is three or five, by arranging the cores non-rotationally symmetrically, it is possible to easily specify a desired core from among a plurality of cores, and it is possible to easily connect multicore fibers to each other.

Note that when the number of cores is three in one or more embodiments, for example, the angles formed by the two cores may be 115°, and the angle formed by the remaining one core may be 130°. In addition, the angles formed by the two cores may be 110°, and the angle formed by the remaining one core may be 140°. Alternatively, other angles may be set.

In addition, when the number of cores is five in one or more embodiments, for example, the angles formed by the four cores may be 70°, and the angle formed by the remaining one core may be 80°. In addition, the angles formed by the four cores may be 69°, and the angle formed by the remaining one core may be 84°. In addition, the angles formed by the four cores may be 68°, and the angle formed by the remaining one core may be 88°. Alternatively, other angles may be set. As described above, among the angles formed by the plurality of outer cores, only one angle may be different from the other angles, and all the other angles may be the same. With such a structure, since all the other angles described above are the same, since the structure is the simplest among the structures that satisfy non-rotational symmetry, a simple multicore fiber configuration can be realized.

Second Embodiments

Figure 3:
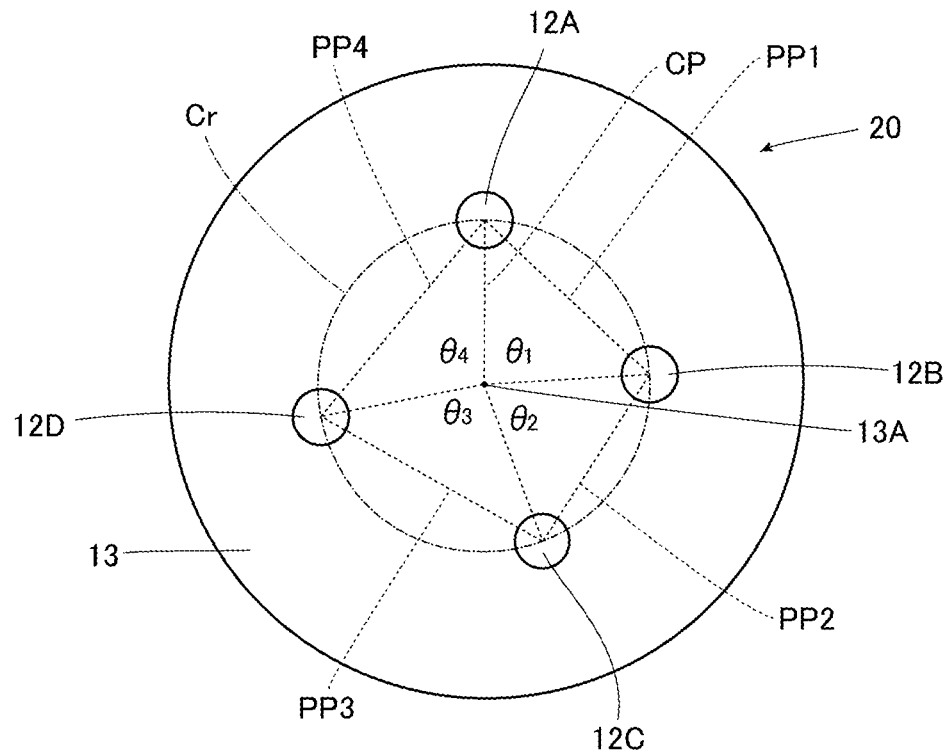
FIG. 3 is a diagram illustrating a structure of a cross section perpendicular to a longitudinal direction of a multicore fiber according to second embodiments.

Next, the second embodiments will be described. FIG. 3 is a diagram illustrating a structure of a cross section perpendicular to a longitudinal direction of the multicore fiber of the second embodiments. Note that the same or equivalent components as those of the first embodiments are designated by the same reference numerals and duplicated description will be omitted unless otherwise specified. In addition, in FIG. 3, hatching is omitted and illustration of a cover layer is omitted to avoid complication of the drawing.

As illustrated in FIG. 3, the configuration of a multicore fiber 20 of one or more embodiments is the same as the configuration of the multicore fiber 10 except that the arrangement of cores 12A to 12D on a circumference Cr is different from that of the multicore fiber 10 of the first embodiments.

In one or more embodiments, the angles formed by the cores are all larger than 60°. Among angles $\theta_1$ to $\theta_4$ formed by the plurality of cores, the angles $\theta_1$ and $\theta_2$ are 85°, the angle $\theta_3$ is 91°, and the angle $\theta_4$ is 99°. As described above, in one or more embodiments, only two angles $\theta_3$ and $\theta_4$ of the angles $\theta_1$ to $\theta_4$ formed by the cores are different from the other angles $\theta_1$ and $\theta_2$, and the other angles $\theta_1$ and $\theta_2$ are the same. In addition, these two angles $\theta_3$ and $\theta_4$ are different from each other. With the configuration illustrated in FIG. 3, the cores 12A to 12D are arranged at non-rotationally symmetric positions and are arranged at non-line-symmetric (or line-asymmetric) positions based on a line passing through the center of the circumference Cr or the cladding and extending along the radial direction of the cladding. Here, the number of cores arranged at non-line-symmetric positions based on the line passing through the center of the circumference Cr or the cladding and extending along the radial direction of the cladding is not limited to the above-described number of cores, and it is sufficient if at least two cores are arranged.

Thus, in one or more embodiments, since the cores 12A to 12D are arranged at non-rotationally symmetric positions, it is possible to easily specify a desired core from the cores 12A to 12D. Therefore, the multicore fibers 20 can be easily connected to each other by making specified desired cores correspond to each other. In addition, when the cores 12A to 12D are arranged at the non-line-symmetric positions as illustrated in FIG. 3, the appearance of the plurality of cores at one end of the multicore fiber 20 is different from the appearance of the plurality of cores at the other end. Therefore, the multicore fibers 20 can be connected to each other by distinguishing one end and the other end of the multicore fibers 20.

Meanwhile, as described above, the angles $\theta_1$ to $\theta_4$ formed by the cores are larger than 60°. Therefore, the core pitches PP1 to PP4 in one or more embodiments are larger than the radius CP of the circumference Cr. Therefore, the crosstalk of the adjacent cores can be suppressed as compared with the case where the radius CP is the same size as the core pitches PP1 to PP4.

In this case, since the structure is the simplest among the structures in which the plurality of cores is arranged at non-line-symmetric positions, a simple multicore fiber configuration can be realized.

In addition, in one or more embodiments, the number of cores may be five as in the first embodiments. Even in this case, as described in the first embodiments, the core pitch is larger than the radius CP of the circumference Cr. Therefore, the crosstalk between adjacent cores can be suppressed. In addition, by arranging the five cores non-rotationally symmetrically, it is possible to easily specify a desired core from among a plurality of cores and it is possible to easily connect multicore fibers to each other as described above.

Note that when the number of cores is five in one or more embodiments, for example, the angles formed by the three cores may be 68°, one of the angles formed by the remaining two cores may be 74°, and the other angle may be 82°. Alternatively, other angles may be set.

Third Embodiments

Figure 4:
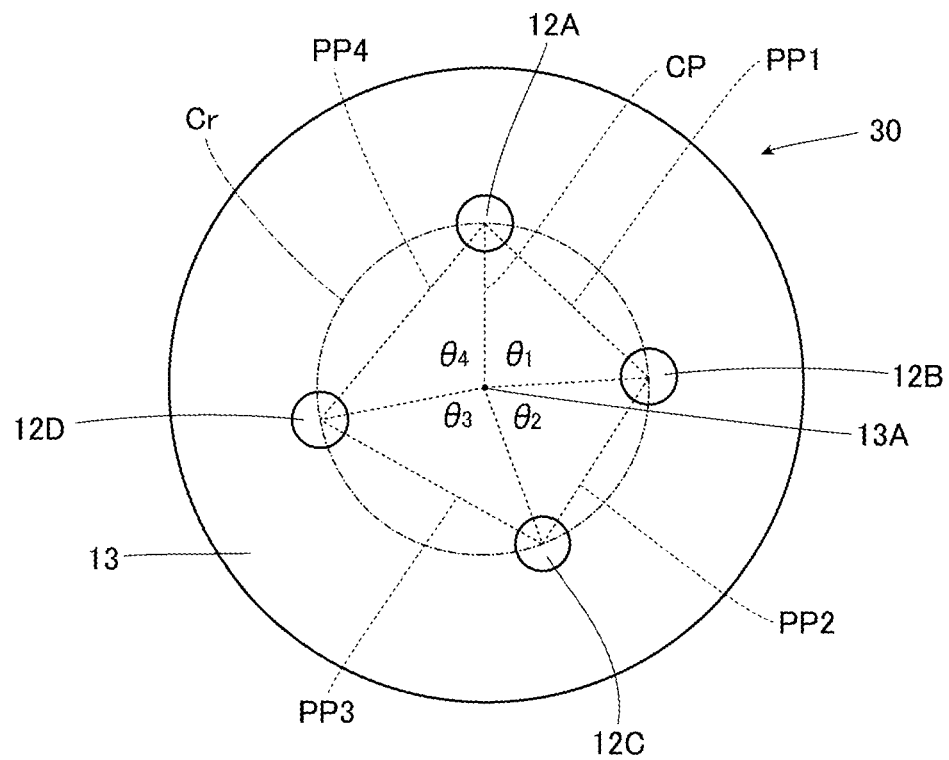
FIG. 4 is a diagram illustrating a structure of a cross section perpendicular to a longitudinal direction of a multicore fiber according to third embodiments.

Next, the third embodiments will be described. FIG. 4 is a diagram illustrating a structure of a cross section perpendicular to a longitudinal direction of the multicore fiber of the third embodiments. Note that the same or equivalent components as those of the first embodiments are designated by the same reference numerals and duplicated description will be omitted unless otherwise specified. In addition, in FIG. 4, hatching is omitted and illustration of a cover layer is omitted to avoid complication of the drawing.

As illustrated in FIG. 4, the configuration of a multicore fiber 30 of one or more embodiments is the same as the configuration of the multicore fiber 10 except that the arrangement of cores 12A to 12D on a circumference Cr is different from that of the multicore fiber 10 of the first embodiments and that of the multicore fiber 20 of the second embodiments.

In one or more embodiments, the angles formed by the cores are all larger than 60°. Of angles $\theta_1$ to $\theta_4$ formed by the cores, the angle $\theta_1$ is 85°, which is the narrowest angle, the angle $\theta_2$ is 88°, which is the second narrowest angle, the angle $\theta_3$ is 92°, and the angle $\theta_4$ is 95°. As described above, in one or more embodiments, the angles $\theta_1$ to $\theta_4$ are all different. In addition, among the angles $\theta_1$ to $\theta_4$, the narrowest angle $\theta_1$ and the second narrowest angle $\theta_2$ are adjacent to each other. With such a configuration, the cores 12A to 12D are arranged at non-rotationally symmetric positions and are arranged at non-line-symmetric positions based on a line passing through the center of the circumference Cr.

As described above, in one or more embodiments, since the angles $\theta_1$ to $\theta_4$ formed by the cores are all different, each of the cores 12A to 12D can be specified. Therefore, it is possible to easily connect the multicore fibers 30 in such a manner that each of the cores 12A to 12D of one multicore fiber 30 corresponds to each of the cores 12A to 12D of the other multicore fiber 30. In addition, since the arrangement of the cores 12A to 12D is non-line-symmetric, the appearance of the plurality of cores at one end of the multicore fiber 30 is different from the appearance of the plurality of cores at the other end. Therefore, the multicore fibers 30 can be connected to each other by distinguishing one end and the other end of the multicore fibers 30.

In addition, in one or more embodiments, the number of cores may be three or five. Even in this case, as described in the first embodiments, the core pitch is larger than the radius CP of the circumference Cr. Therefore, the crosstalk between adjacent cores can be suppressed. In addition, by arranging the three or five cores non-rotationally symmetrically, it is possible to easily specify a desired core from among a plurality of cores and it is possible to easily connect multicore fibers to each other as described above. In addition, when the angles formed by the cores are all different, the arrangement of the cores is non-line-symmetric as described above. Therefore, since the appearance of the plurality of cores at one end of the multicore fiber is different from the appearance of the plurality of cores at the other end, the multicore fibers can be connected by distinguishing one end and the other end of the multicore fibers.

Note that when the number of cores is three in one or more embodiments, the angles formed by the cores may, for example, be 115°, 120°, and 125° or may be 110°, 120°, and 130° clockwise. Alternatively, other angles may be set. In addition, when the number of cores is five in one or more embodiments, for example, the angles formed by the cores may be 66°, 69°, 72°, 75°, and 78° clockwise. Alternatively, other angles may be set.

Fourth Embodiments

Figure 5:
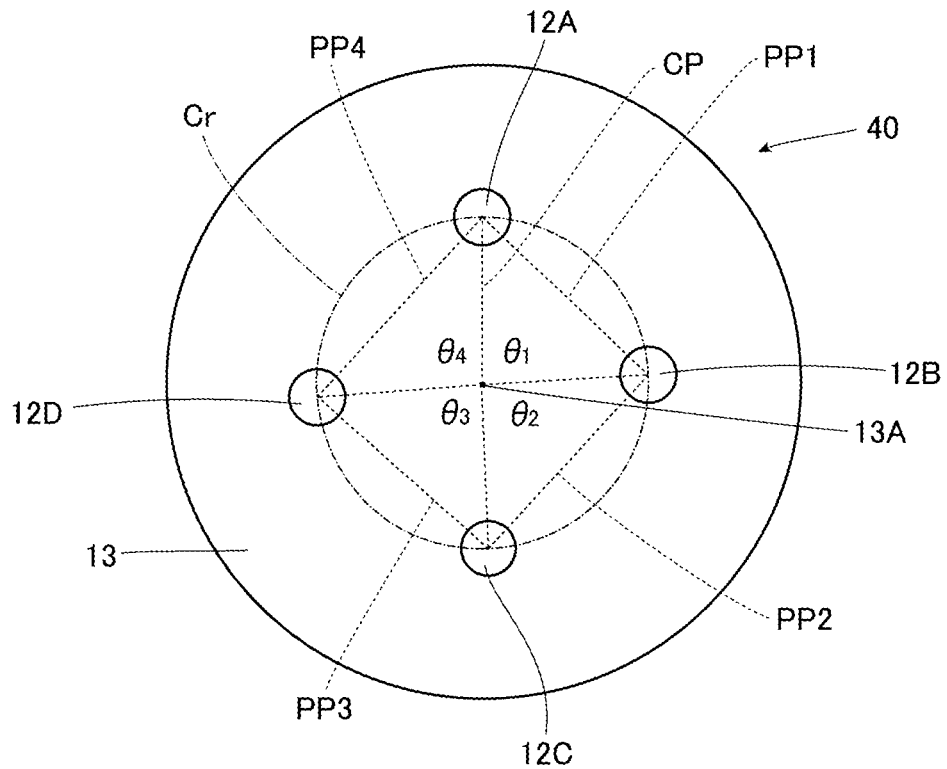
FIG. 5 is a diagram illustrating a structure of a cross section perpendicular to a longitudinal direction of a multicore fiber according to fourth embodiments.

Next, the fourth embodiments will be described. FIG. 5 is a diagram illustrating a structure of a cross section perpendicular to a longitudinal direction of the multicore fiber of the fourth embodiments. Note that the same or equivalent components as those of the first embodiments are designated by the same reference numerals and duplicated description will be omitted unless otherwise specified. In addition, in FIG. 5, hatching is omitted and illustration of a cover layer is omitted to avoid complication of the drawing.

As illustrated in FIG. 5, the configuration of a multicore fiber 40 of one or more embodiments is the same as the configuration of the multicore fiber 10 except that the arrangement of cores 12A to 12D on a circumference Cr is different from that of the multicore fiber 10 of the first embodiments, that of the multicore fiber 20 of the second embodiments, and that of the multicore fiber 30 of the third embodiments.

The multicore fiber 40 of one or more embodiments is similar to the multicore fiber 30 of the third embodiments in that the angles formed by the cores are all different, but the arrangement of the cores 12A to 12D is different from the arrangement of the cores 12A to 12D in the multicore fiber 30. In one or more embodiments, the angle $\theta_1$ is 85°, which is the narrowest angle, the angle $\theta_2$ is 92°, the angle $\theta_3$ is 88°, which is the second narrowest angle, and the angle $\theta_4$ is 95°. As described above, in one or more embodiments, the cores 12A to 12D are arranged such that the narrowest angle 85° and the second narrowest angle 88° are not adjacent to each other.

With such a configuration, the same effects as those of the third embodiments can be obtained.

In addition, in one or more embodiments, as described above, since the cores 12A to 12D are arranged such that the narrowest angle formed by the cores and the second narrowest angle formed by the cores are not adjacent to each other, it is possible to suppress at least three cores from being densely arranged on the circumference Cr. Therefore, it is possible to effectively suppress the crosstalk from concentrating on a specific core among the cores 12A to 12D.

In addition, in one or more embodiments, the number of cores may be five. In this case, for example, the angles formed by the cores may be 66°, 75°, 72°, 69°, and 78° clockwise. With such an angle pattern, the narrowest angle 66° formed by the cores and the second narrowest angle 69° formed by the cores are not adjacent to each other. Note that the cores may be arranged in another angle pattern such that the narrowest angle formed by the cores and the second narrowest angle formed by the cores are not adjacent to each other.

The multicore fiber of the present invention has been described by taking the first to fourth embodiments as an example, but the present invention is not limited thereto. The configuration of the multicore fiber can be changed as long as the multicore fiber includes a cladding, and three or more and five or less cores arranged at non-rotationally symmetric positions on a circumference centered on the center of the cladding described above, in which no core is arranged at the center of the cladding described above, angles formed by lines adjacent to each other among a plurality of lines connecting the center of the cladding described above and the center of each of the cores described above are all larger than 60°.

For example, the multicore fiber may be formed in a trench shape.

In addition, the refractive indices and diameters of the cores adjacent to each other may be different from each other.

In addition, the angles formed by the cores described in the above embodiments are an example, and the angles formed by the cores can be appropriately changed.

Next, an example of an optical fiber cable including the multicore fiber of the present invention will be described.

Figure 6:
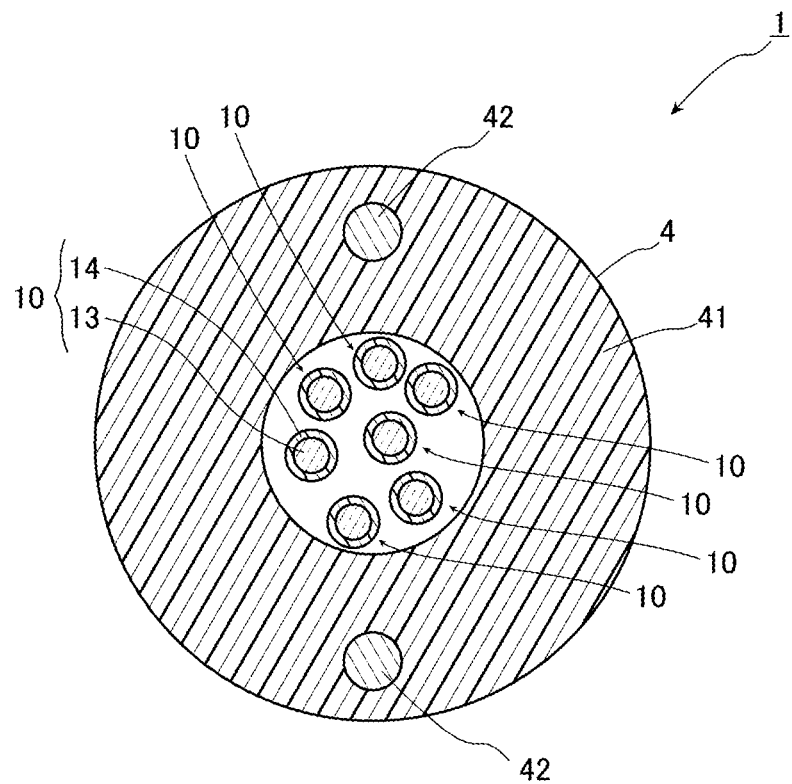
FIG. 6 is a diagram illustrating a structure of a cross section perpendicular to a longitudinal direction of an example of an optical fiber cable including the multicore fiber according to the first embodiments.

FIG. 6 is a diagram illustrating a structure of a cross section perpendicular to a longitudinal direction of an optical fiber cable 1 including the multicore fiber 10 of the first embodiments. As illustrated in FIG. 6, the optical fiber cable 1 includes a sheath 4 and the multicore fiber 10 according to the first embodiments arranged in the sheath 4. The multicore fiber 10 includes the cores 12A to 12D, the cladding 13, and the cover 14 covering the cladding 13. Note that, in FIG. 6, illustration of the cores 12A to 12D is omitted to avoid complication of the drawing.

The shape of the sheath 4 is a cylindrical shape in a cross section perpendicular to the longitudinal direction, and a central portion in the cross section is a circular cavity. The sheath 4 includes a sheath body portion 41 and a reinforcing member 42. The sheath body portion 41 is made of resin and forms an outer shape of the sheath 4. Examples of the resin constituting the sheath body portion 41 include thermoplastic resin. Examples of the thermoplastic resin include resins such as polyvinyl chloride (PVC), polyethylene (PE), polyamide (PA), ethylene fluoride, and polypropylene (PP). The reinforcing member 42 is a member including, for example, a wire and giving strength to the optical fiber cable 1. The reinforcing member 42 is made of, for example, copper, iron, nickel, stainless steel, fiber reinforced plastic (FRP), or the like.

As described above, the optical fiber cable 1 includes the multicore fiber 10 in which crosstalk can be suppressed. Therefore, the crosstalk of the optical fiber cable can be suppressed. In addition, when the optical fiber cables 1 are connected to each other, as described above, a desired core (for example, core 12A) of each multicore fiber 10 included in one optical fiber cable 1 can be specified, and a core (for example, core 12A) corresponding to the desired core of the one multicore fiber in each multicore fiber 10 included in the other optical fiber cable 1 can be specified. Therefore, the optical fiber cables 1 can be easily connected to each other by making desired cores correspond to each other.

Note that an optical fiber cable may be configured using at least one of the multicore fiber 20 of the second embodiments, the multicore fiber 30 of the third embodiments, and the multicore fiber 40 of the fourth embodiments instead of the multicore fiber 10 of the first embodiments or together with the multicore fiber 10.

In addition, the optical fiber cable 1 described above is an example, and may be an optical fiber cable having another configuration.

Next, an example of an optical connector including the multicore fiber of the present invention will be described.

Figure 7:
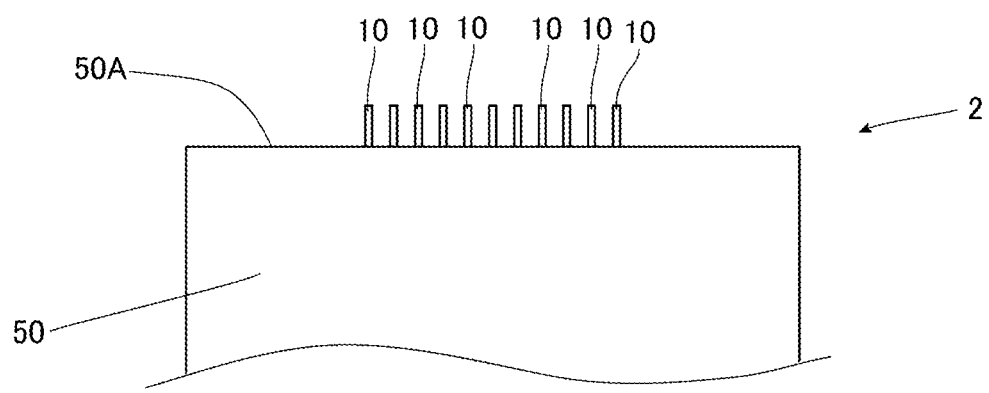
FIG. 7 is a plan view illustrating an end side of an example of an optical connector including the multicore fiber according to the first embodiments.

FIG. 7 is a plan view illustrating an end side of an optical connector 2 including the multicore fiber 10 according to the first embodiments. The optical connector 2 is, for example, a multifiber push-on (MPO) optical connector. As illustrated in FIG. 7, the optical connector 2 includes at least one multicore fiber 10 and a ferrule 50. The ferrule 50 is a member that holds the end portion of the multicore fiber 10, and is formed of, for example, resin. In addition, the multicore fiber 10 is arranged in a fiber insertion hole of the ferrule 50.

Figure 8:
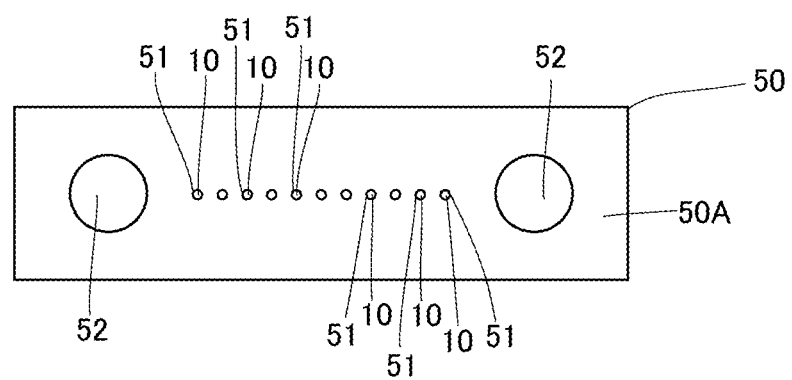
FIG. 8 is a front view illustrating a ferrule and a multicore fiber of the optical connector illustrated in FIG. 7.

FIG. 8 is a front view illustrating the ferrule 50 and the multicore fiber 10 of the optical connector 2 illustrated in FIG. 7. As illustrated in FIG. 8, a pair of guide pin insertion holes 52 and a plurality of fiber insertion holes 51 are formed in the ferrule 50. Guide pins, which are not illustrated, are inserted into the guide pin insertion holes 52, and the optical connector 2 on one side and the optical connector 2 on the other side are connected via the guide pins. The end portions of the multicore fiber 10 are inserted into the fiber insertion holes 51, and the end portions of the multicore fiber 10 protrude from an end surface 50A of the ferrule 50. Note that a portion of the multicore fiber 10 protruding from the end surface 50A may be cut out, and the end surface of the multicore fiber 10 and the end surface 50A of the ferrule 50 may be flush with each other.

As described above, the optical connector 2 includes the multicore fiber 10 in which crosstalk can be suppressed. Therefore, the crosstalk of the optical connector 2 can be suppressed. In addition, when the optical connectors 2 are connected to each other, as described above, a desired core of each multicore fiber 10 included in one optical connector 2 can be specified, and a core corresponding to the desired core of the one multicore fiber in each multicore fiber 10 included in the other optical connector 2 can be specified. Therefore, the optical connectors 2 can be easily connected to each other by making desired cores correspond to each other. In addition, in this case, a desired outer core of the plurality of multicore fibers included in the optical connector 2 can be specified, and it is easy to align the core arrangement of the plurality of multicore fibers in the same manner in the connector cross section.

Note that an optical connector may be configured using at least one of the multicore fiber 20 of the second embodiments, the multicore fiber 30 of the third embodiments, and the multicore fiber 40 of the fourth embodiments instead of the multicore fiber 10 of the first embodiments or together with the multicore fiber 10.

In addition, the optical connector 2 described above is an example, and may be an optical connector having another configuration.

According to the present invention, a multicore fiber, an optical fiber cable, and an optical connector capable of suppressing crosstalk and facilitating connection can be provided, and can be used, for example, in the field of communication or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A multicore fiber comprising:
   a cladding; and
   four or five cores disposed at rotationally asymmetric positions on a circumference centered at a center of the cladding, wherein
   no core is disposed at the center of the cladding,
   angles formed by adjacent ones of lines connecting the center of the cladding and respective ones of the cores are all larger than 60°,
   the angles are all different, and
   a narrowest angle of the angles is not adjacent to a second narrowest angle of the angles.

2. The multicore fiber according to claim 1, wherein two or more of the cores are disposed at linearly asymmetric positions with reference to a line passing through the center of the cladding and extending along a radial direction of the cladding.

3. The multicore fiber according to claim 2, wherein a number of the cores is four.

4. An optical fiber cable comprising:
   a sheath; and
   the multicore fiber according to claim 2 in the sheath.

5. An optical connector comprising:
   a ferrule; and
   the multicore fiber according to claim 2, wherein
   one end of the multicore fiber is disposed in a fiber insertion hole of the ferrule.

6. An optical fiber cable comprising:
   a sheath; and
   the multicore fiber according to claim 1 in the sheath.

7. An optical connector comprising:
   a ferrule; and
   the multicore fiber according to claim 1, wherein
   one end of the multicore fiber is disposed in a fiber insertion hole of the ferrule.

8. The multicore fiber according to claim 1, wherein a number of the cores is four.

9. A multicore fiber comprising:
   a cladding; and
   four or five cores disposed at rotationally asymmetric positions on a circumference centered at a center of the cladding, wherein
   no core is disposed at the center of the cladding,
   angles formed by adjacent ones of lines connecting the center of the cladding and respective ones of the cores are all larger than 60°,
   two angles of the angles are different from remaining angles,
   the two angles are different from each other, and
   all of the remaining angles are the same.

10. The multicore fiber according to claim 9, wherein two or more of the cores are disposed at linearly asymmetric positions with reference to a line passing through the center of the cladding and extending along a radial direction of the cladding.

11. An optical fiber cable comprising:
   a sheath; and
   the multicore fiber according to claim 10 in the sheath.

12. An optical connector comprising:
   a ferrule; and
   the multicore fiber according to claim 10, wherein
   one end of the multicore fiber is disposed in a fiber insertion hole of the ferrule.

13. The multicore fiber according to claim 9, wherein a number of the cores is four.

14. An optical fiber cable comprising:
   a sheath; and
   the multicore fiber according to claim 9 in the sheath.

15. An optical connector comprising:
   a ferrule; and
   the multicore fiber according to claim 9, wherein
   one end of the multicore fiber is disposed in a fiber insertion hole of the ferrule.

* * * * *